(12) United States Patent
Gnamm et al.

(10) Patent No.: US 8,359,852 B2
(45) Date of Patent: Jan. 29, 2013

(54) HYDRAULIC UNIT OF A HYDRAULIC VEHICLE BRAKE SYSTEM

(75) Inventors: Bernhard Gnamm, Summerville, SC (US); Andreas Weh, Sulzberg (DE)

(73) Assignee: Robert Bosch GmbH, Stuttgart (DE)

( * ) Notice: Subject to any disclaimer, the term of this patent is extended or adjusted under 35 U.S.C. 154(b) by 880 days.

(21) Appl. No.: 12/305,704

(22) PCT Filed: Nov. 30, 2007

(86) PCT No.: PCT/EP2007/063078
§ 371 (c)(1),
(2), (4) Date: Dec. 19, 2008

(87) PCT Pub. No.: WO2008/074612
PCT Pub. Date: Jun. 26, 2008

(65) Prior Publication Data
US 2010/0263368 A1 Oct. 21, 2010

(30) Foreign Application Priority Data
Dec. 19, 2006 (DE) .......................... 10 2006 059 923

(51) Int. Cl.
*F16D 31/02* (2006.01)
(52) U.S. Cl. ..................... 60/416; 138/31; 303/DIG. 10; 303/DIG. 11

(58) Field of Classification Search .................... 60/416; 138/30, 31; 303/DIG. 10, 11
See application file for complete search history.

(56) References Cited

U.S. PATENT DOCUMENTS
6,199,959 B1   3/2001   Beck et al.
2003/0205283 A1   11/2003   Maloney et al.

FOREIGN PATENT DOCUMENTS
JP   2001 80487   * 3/2001

* cited by examiner

*Primary Examiner* — Daniel Lopez
(74) *Attorney, Agent, or Firm* — Maginot, Moore & Beck

(57) ABSTRACT

The invention relates to a hydraulic unit of a vehicle hydraulic brake system having a hydraulic block, a storage unit, and a holding unit. The storage unit is inserted into the hydraulic block, and the holding unit is adjusted for holding the hydraulic block locally fixed to an associated vehicle. The storage unit is constructed with a holding surface which forms a section of the outer side of the hydraulic unit, and the holding unit engages with the holding surface of the storage unit in order to hold the hydraulic block locally fixed above the storage unit. Furthermore, the invention also relates to a storage unit where one outer surface of the storage unit which forms an outer side of the hydraulic unit is constructed as a holding surface for attaching the hydraulic block in the vehicle.

12 Claims, 2 Drawing Sheets

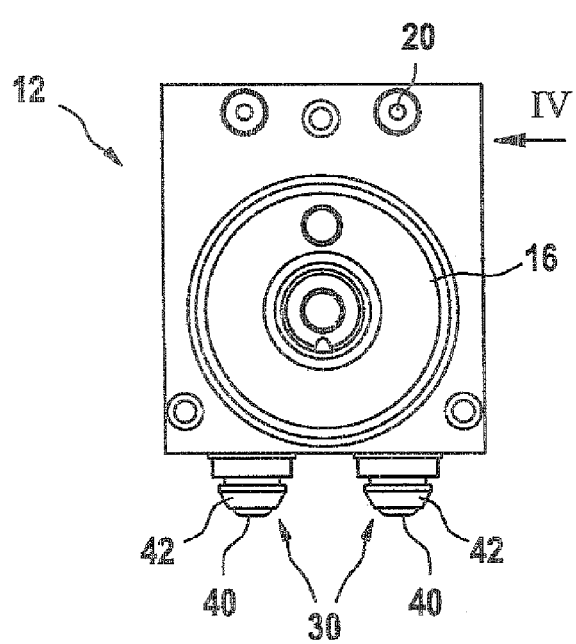
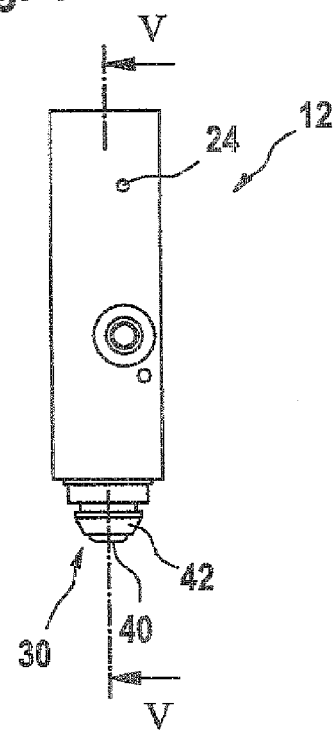
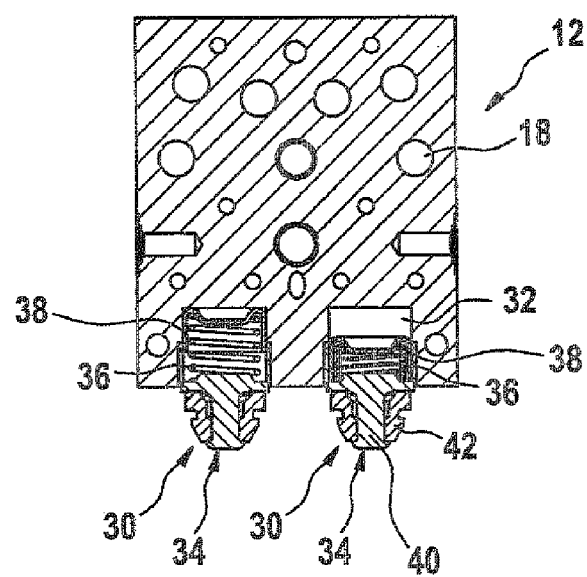

HYDRAULIC UNIT OF A HYDRAULIC VEHICLE BRAKE SYSTEM

CROSS-REFERENCE TO RELATED APPLICATION

This application is a 35 USC 371 application of PCT/EP 2007/063078 filed on Nov. 30, 2007.

BACKGROUND OF THE INVENTION

1. Field of the Invention

The invention relates to a hydraulic unit of a hydraulic vehicle brake system, having a hydraulic block, a storage device, and a holding device, in which the storage device is inserted into the hydraulic block, and the holding device is adapted for stationary mounting of the hydraulic block on an associated vehicle. Moreover, the invention relates to a storage device of a hydraulic unit of a vehicle brake system, which is intended for disposition in a hydraulic block of the hydraulic unit and has a face which in the thus-inserted state of the storage device forms an outside of the hydraulic unit.

2. Description of the Prior Art

In hydraulic vehicle brake systems, hydraulic units are used to selectively deliver or remove hydraulic fluid to and from the associated brakes. In hydraulic fluid delivery, flow surges and pulsations can occur at the master cylinder and the brakes because of the pumps that can be used and because of the motions of associated pistons. In known hydraulic units, to absorb such flow surges and pulsations, storage devices are provided, which can receive hydraulic fluid from time to time and afterward dispense it again. The storage devices are embodied with a hollow chamber, which is embodied in the associated hydraulic block, and as a rule, they have a piston which is spring-loaded and can be displaced by fluid that flows into the storage device. To close the hollow chamber in fluid-tight fashion, a reservoir cap is provided in known storage devices, which is screwed or press-fitted and wedged into the associated hydraulic block.

In such hydraulic vehicle brake systems, hydraulic units must be attached in stationary fashion in the associated vehicle and must as a rule also be secured in damped fashion, so that vehicle vibration and shock are not transmitted entirely to the hydraulic unit, and conversely so that the hydraulic unit has a certain freedom of motion relative to the vehicle while the hydraulic unit is in operation. Moreover, the damped mounting of the hydraulic block of a hydraulic unit serves especially to prevent as much as possible the transmission of structure-borne sound from the hydraulic block and the pump located in it to the rest of the vehicle.

In known hydraulic units, the attempt is constantly made to attain the aforementioned functions as comprehensively as possible and at the same time to achieve an especially economical manufacture and assembly of the entire hydraulic unit.

OBJECT AND SUMMARY OF THE INVENTION

It is therefore an object of the invention to furnish a hydraulic unit and a storage device of a hydraulic unit with which storage of hydraulic fluid with correct function is assured and which moreover can be manufactured and assembled even more economically than known devices.

According to the invention, the object is attained with a hydraulic unit of a hydraulic vehicle brake system, which has a hydraulic block, a storage device, and a holding device, and in which the storage device is inserted into the hydraulic block, and the holding device is adapted for stationary mounting of the hydraulic block on an associated vehicle. Moreover, the storage device is designed with a holding face, which forms a portion of the outside of the hydraulic unit, and in which the holding device engages this holding face of the storage device in order to mount the hydraulic block in stationary fashion via the storage device.

Moreover, the object is attained according to the invention with a storage device of a hydraulic unit of a vehicle brake system, which is intended for disposition in a hydraulic block of the hydraulic unit and has a face which in the thus-inserted state of the storage device forms an outside of the hydraulic unit. According to the invention, moreover, the face is designed as a holding face, which a holding device can engage in order to mount the hydraulic block in stationary fashion on an associated vehicle.

With the attainment of this object according to the invention, the storage device of a hydraulic unit of a vehicle brake system is given a dual function, in that first it acts as a reservoir for hydraulic fluid and second it takes on a holding function for the entire hydraulic block of the hydraulic unit. According to the invention, the holding function is furnished especially economically, because a face is suitably adapted for mounting which in the assembled state of the storage device forms an outside of the hydraulic unit. Then according to the invention, a holding device, with which the hydraulic block is mounted in stationary fashion via the storage device, is placed against this outside face, which according to the invention forms a holding face, of the storage device.

According to the invention, the storage device is thus expanded with the holding function. As a result, special machining or preparation of the hydraulic block, which actually serves as a pump housing, is dispensed with, as is the attachment of a separate holding element to the hydraulic block. Moreover, the space previously required for a separate holding element can be dispensed with. Moreover, the number of components of the hydraulic unit of the invention is less than in known hydraulic units. This has advantages in view of the logistical costs for manufacture and the procurement of spare parts.

Finally, the embodiment according to the invention also forms the basis and the point of departure for further improvements and costs savings in surrounding elements, cooperating functionally with the holding face, of the hydraulic unit of the invention. Further improvements of this kind will be described below.

As a further improvement of the embodiment of the invention, preferably the holding face of the storage device is designed with an elastic element, which is attached to a part of the storage device that is secured in stationary fashion to the hydraulic block. The part of the storage device that is thus attached in stationary fashion is preferably a reservoir cap, which during its manufacture can be adapted suitably so that an elastic element can be provided, which is especially economical and can be virtually cost-neutral. The elastic element can be designed similarly to previously known elements. However, especially preferably, it is designed such that it can be slipped onto a mandrel embodied on a reservoir cap.

Advantageously, furthermore, the holding device is designed with a metal sheet in which an opening is embodied, into which opening the holding face of the storage device and in particular the elastic element are thrust and held by positive engagement. Such an embodiment is especially economical, and the associated components can easily be installed in automated fashion as well. Alternatively or in addition, the holding device is advantageously designed by means of a nonpositive connection, in particular an adhesive connection.

Moreover, advantageously and economically, the storage device is designed with a reservoir cap, which is press-fitted into the hydraulic block and on whose outside the holding face is embodied.

In a hydraulic unit, in which a total of two storage devices are provided, of which a holding face for the holding device is preferably embodied on only one of the storage devices. With this embodiment, a mount is advantageously created in which the hydraulic block is held at only two points, on one of the storage devices and the other on a bearing point attached directly to the hydraulic unit itself.

Finally, preferably, the holding device of the hydraulic unit of the invention is itself designed in angled fashion; the holding face of the storage device is disposed on a first leg of the angle, and a second holding region for the hydraulic block is disposed on the second leg. Moreover, the holding regions are preferably designed such that the holding device is placed against the hydraulic block by a purely linear motion and in the process is held by positive engagement on one holding region and by nonpositive engagement on the other holding region. This refinement as well has special advantages in terms of the total cost of assembly and the capability of automating the assembly.

BRIEF DESCRIPTION OF THE DRAWINGS

One exemplary embodiment of a hydraulic unit of the invention and of an associated storage device of the invention will be described below in conjunction with the accompanying schematic drawings, in which:

FIG. 3 is the side view III as indicated in FIG. 2 of the associated hydraulic block;

FIG. 4 is the side view IV as indicated in FIG. 3; and

FIG. 5 is the section V-V as indicated in FIG. 4.

DESCRIPTION OF THE PREFERRED EMBODIMENT

Figure 1:
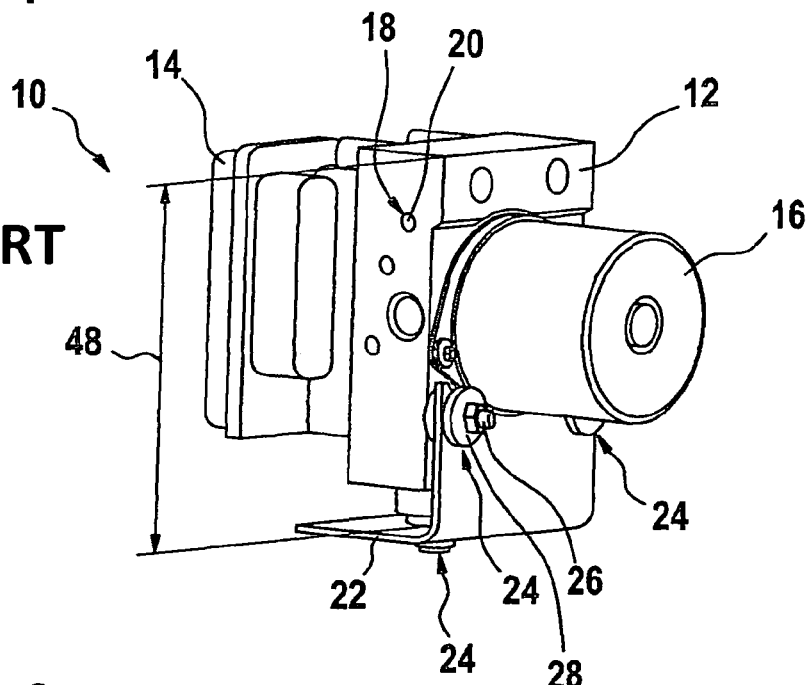
FIG. 1 shows a perspective view of a hydraulic unit in the prior art.

In FIG. 1, a hydraulic unit 10 in accordance with the prior art is shown, which as its essential elements has an essentially parallelepiped hydraulic block 12 and a control unit 14 disposed on it. The hydraulic block 12 serves among other things to receive a hydraulic pump (not shown), whose pump motor 16 protrudes laterally from the hydraulic block 12. Also in the hydraulic block 12, by means of bores, hydraulic conduits 18 are embodied, which are partially closed by means of calked features 20 on the outside of the hydraulic block 12.

For holding the hydraulic block 12 on an associated vehicle (not shown) in both stationary and at the same time damped fashion, a holding device 22 is provided, in the form of an angle iron, on which the hydraulic block 12 is braced by means of three holder bearings 24. Each of the holder bearings 24, as a component that is especially adapted to the holding and bracing function, is screwed onto the hydraulic block 12. The individual holder bearing 24 moreover has a mandrel 26, which protrudes outward from the hydraulic block 12 and onto which an elastic element 28 is thrust.

In FIGS. 2 through 5, an exemplary embodiment of a hydraulic unit 10 according to the invention is shown, in which once again a hydraulic block 12, a control unit 14, a pump motor 16, and hydraulic conduits 18 are provided. The hydraulic unit 10 according to the invention furthermore has two storage devices 30, which are each formed with a hollow chamber 32 embodied in the hydraulic block 12.

Each hollow chamber 32 is provided with an associated reservoir cap 34, which is wedged into the hydraulic block 12. In this way, the hollow chamber 32 is closed off in fluid-tight fashion from the exterior of the hydraulic block 12. In each hollow chamber 32 is a helical spring 36 and a piston 38 that is prestressed resiliently by the helical spring 36 in the direction of one of the hydraulic conduits 18.

One of the reservoir caps 34 simultaneously serves as a holder or holder bearing for the associated holding device 22, which, in the hydraulic unit 10 of the invention as well, is designed in the form of an angle iron. The reservoir cap 34 has an outer holding face 40 in the form of a cylindrical attachment, onto which an especially adapted elastic element 42 is thrust. The elastic element 42 is held by positive engagement on the holding face 40 by elastic widening and is thrust into an opening (not enumerated), which is embodied on the holding device 22 in such a way that the elastic element 42 is held there as well by positive engagement. Also on the holding device 22, a second opening 46 is embodied on the holding device to the right of the first opening, into which the holding face 40, in the form of the cylindrical attachment of the second storage device 30, protrudes. However, in the exemplary embodiment shown in FIG. 2, an elastic element 42 is not disposed on this cylindrical attachment, and thus the hydraulic block 10 can move slightly relative to this opening 46. Only one further holder bearing 24 is provided on the second leg of the holding device 22 that is designed as an angle iron, so that all in all, a two-point bearing for the hydraulic block is created. Alternatively, the second reservoir cap 34 too can be provided with an elastic element 42, thus furnishing a total of three bearing points (see FIGS. 3 through 5).

Figure 2:
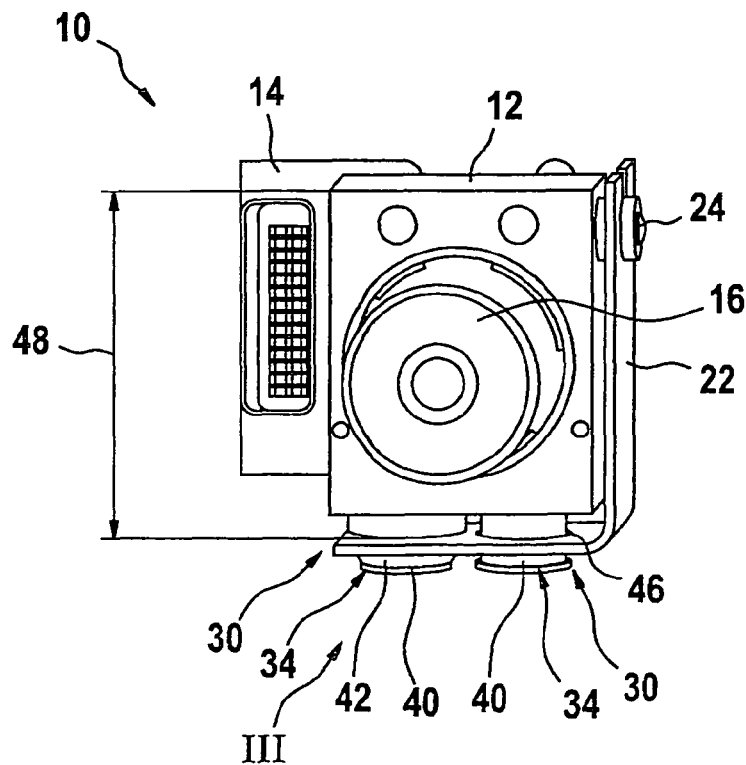
FIG. 2 shows a perspective view of a hydraulic unit according to the invention.

With this kind of design of a hydraulic unit 10 as shown in FIGS. 2 through 5, an embodiment that is especially favorable in terms of the production and assembly costs is created. Moreover, with this embodiment, the entire hydraulic unit 10 can be made especially small, which is advantageous in terms of the installation space required. For instance, the height of the hydraulic unit 10 of the invention, in particular, as indicated by reference numeral 48 in FIG. 2, is considerably less than in comparable hydraulic units 10 of the prior art (see FIG. 1).

The foregoing relates to the preferred exemplary embodiment of the invention, it being understood that other variants and embodiments thereof are possible within the spirit and scope of the invention, the latter being defined by the appended claims.

The invention claimed is:

1. A hydraulic unit of a hydraulic vehicle brake system, comprising a hydraulic block, a storage device, and a holding device, the storage device being formed into the hydraulic block, the holding device being adapted for stationary mounting of the hydraulic block on an associated vehicle, the storage device having a holding face, which forms a portion of an outside of the hydraulic unit, wherein the holding device engages the holding face of the storage device in order to mount the hydraulic block in stationary fashion via the storage device, wherein two storage devices are provided, of which a holding face for the holding device is embodied on only one of the two storage devices.

2. The hydraulic unit as defined by claim 1, wherein the holding face of the storage device is designed with an elastic element, which is attached to a part of the storage device that is secured in stationary fashion to the hydraulic block.

3. The hydraulic unit as defined by claim 2, wherein the holding device is designed with a metal sheet in which an opening is embodied, into which opening the holding face of the storage device and the elastic element are thrust and held by positive engagement.

4. The hydraulic unit as defined by claim 3, wherein the holding device is embodied as an angle, the holding face of the storage device being engaged with a first leg of the angle, a second holding face for the hydraulic block being engaged with a second leg of the angle, the holding faces being formed so that the holding device is placed against the hydraulic block by a purely linear motion and is held by positive engagement on the holding face of the storage device and is guided linearly by the second holding face for the hydraulic block.

5. The hydraulic unit as defined by claim 2, wherein the storage device is provided with a reservoir cap, which is press-fitted into the hydraulic block and on whose outside the holding face is embodied.

6. The hydraulic unit as defined by claim 2, wherein the holding device is embodied as an angle, the holding face of the storage device being engaged with a first leg of the angle, a second holding face for the hydraulic block being engaged with a second leg of the angle, the holding faces being formed so that the holding device is placed against the hydraulic block by a purely linear motion and is held by positive engagement on the holding face of the storage device and is guided linearly by the second holding face for the hydraulic block.

7. The hydraulic unit as defined by claim 1, wherein the holding device is designed with a metal sheet in which an opening is embodied, into which opening the holding face of the storage device and the elastic element are thrust and held by positive engagement.

8. The hydraulic unit as defined by claim 7, wherein the storage device is provided with a reservoir cap, which is press-fitted into the hydraulic block and on whose outside the holding face is embodied.

9. The hydraulic unit as defined by claim 7, wherein the holding device is embodied as an angle, the holding face of the storage device being engaged with a first leg of the angle, a second holding face for the hydraulic block being engaged with a second leg of the angle, the holding faces being formed so that the holding device is placed against the hydraulic block by a purely linear motion and is held by positive engagement on one the holding face of the storage device and is guided linearly by the second holding face for the hydraulic block.

10. The hydraulic unit as defined by claim 1, wherein the storage device is provided with a reservoir cap, which is press-fitted into the hydraulic block and on whose outside the holding face is embodied.

11. The hydraulic unit as defined by claim 10, wherein the holding device is embodied as an angle, the holding face of the storage device being engaged with a first leg of the angle, a second holding face for the hydraulic block being engaged with a second leg of the angle, the holding faces being formed so that the holding device is placed against the hydraulic block by a purely linear motion and is held by positive engagement on one the holding face of the storage device and is guided linearly by the second holding face for the hydraulic block.

12. The hydraulic unit as defined by claim 1, wherein the holding device is embodied as an angle, the holding face of the storage device being engaged with a first leg of the angle, a second holding face for the hydraulic block being engaged with a second leg of the angle, the holding faces being formed so that the holding device is placed against the hydraulic block by a purely linear motion and is held by positive engagement on the holding face of the storage device and is guided linearly by the second holding face for the hydraulic block.

* * * * *

UNITED STATES PATENT AND TRADEMARK OFFICE
CERTIFICATE OF CORRECTION

PATENT NO. : 8,359,852 B2
APPLICATION NO. : 12/305704
DATED : January 29, 2013
INVENTOR(S) : Gnamm et al.

It is certified that error appears in the above-identified patent and that said Letters Patent is hereby corrected as shown below:

In the claims:

Claim 9 (col. 6, line 8):

Replace "engagement on one the holding face" with -- engagement on the holding face --

Claim 11 (col. 6, line 22):

Replace "engagement on one the holding face" with -- engagement on the holding face --

Signed and Sealed this
First Day of October, 2013

Teresa Stanek Rea
*Deputy Director of the United States Patent and Trademark Office*